US012225495B2

(12) United States Patent
Han et al.

(10) Patent No.: US 12,225,495 B2
(45) Date of Patent: Feb. 11, 2025

(54) DEVICE AND METHOD TO IMPROVE HORIZONTAL AND VERTICAL POSITIONING ACCURACY

(71) Applicant: Apple Inc., Cupertino, CA (US)

(72) Inventors: Seunghee Han, San Jose, CA (US);
Shafi Bashar, Santa Clara, CA (US);
Yuan Zhu, Beijing (CN); Yang Tang,
Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 17/099,969

(22) Filed: Nov. 17, 2020

(65) Prior Publication Data
US 2021/0112516 A1 Apr. 15, 2021

Related U.S. Application Data

(63) Continuation of application No. 16/407,148, filed on May 8, 2019, now Pat. No. 10,856,252, which is a
(Continued)

(51) Int. Cl.
*H04W 64/00* (2009.01)
*G01S 1/20* (2006.01)
(Continued)

(52) U.S. Cl.
CPC .............. *H04W 64/00* (2013.01); *G01S 1/20* (2013.01); *G01S 3/48* (2013.01); *G01S 5/0036* (2013.01);
(Continued)

(58) Field of Classification Search
CPC ... H04W 64/00; H04W 64/003; H04W 24/10; H04W 4/029; H04W 4/02; H04W 4/70;
(Continued)

(56) References Cited

U.S. PATENT DOCUMENTS 6,471,831 B2   10/2002  Lu et al.
9,420,476 B2    8/2016  Koutsimanis
(Continued)

FOREIGN PATENT DOCUMENTS

CN   101616360 A   12/2009
CN   102065537 A    5/2011
(Continued)

OTHER PUBLICATIONS

"International Application Serial No. PCT US2015 062281, International Search Report mailed Feb. 29, 2016", 4 pgs.
(Continued)

*Primary Examiner* — David Q Nguyen
(74) *Attorney, Agent, or Firm* — Kowert, Hood, Munyon, Rankin & Goetzel, P.C.

(57) ABSTRACT

User equipment (UE), an enhanced NodeB (eNB) and method of improving positioning accuracy and enabling vertical domain positioning of the UE are generally described. The UE may receive a prsInfo control signal having at least one PRS configuration and subsequently a plurality of Reference Signals (RSs). The RSs may have a first Positioning Reference Signal (PRS) pattern in a first set of PRS subframes and a second PRS pattern in a second set of PRS subframes received prior to a subsequent first set of PRS subframes. The RSs may have a vertical positioning RS and a lateral positioning RS. The UE may measure PRS resource elements (REs), each having a PRS, in the first and second PRS pattern. The UE may transmit a measurement of the PRS in the first and second PRS pattern. The patterns may enable horizontal and vertical positioning to be determined.

20 Claims, 10 Drawing Sheets

Related U.S. Application Data continuation of application No. 15/524,842, filed as application No. PCT/US2015/062281 on Nov. 24, 2015, now Pat. No. 10,383,080.

(60) Provisional application No. 62/107,665, filed on Jan. 26, 2015.

(51) Int. Cl.

| | | |
|---|---|---|
| *G01S 3/48* | (2006.01) | |
| *G01S 5/00* | (2006.01) | |
| *G01S 5/02* | (2010.01) | |
| *G01S 5/10* | (2006.01) | |
| *G01S 5/12* | (2006.01) | |
| *H04J 11/00* | (2006.01) | |
| *H04W 56/00* | (2009.01) | |

(52) U.S. Cl.
CPC .............. *G01S 5/0236* (2013.01); *G01S 5/10* (2013.01); *G01S 5/12* (2013.01); *H04J 11/00* (2013.01); *H04W 56/001* (2013.01)

(58) Field of Classification Search
CPC ............. H04W 72/048; H04W 64/006; H04W 72/0446; H04W 72/0406; H04W 56/001; H04W 88/08; H04W 8/26; H04W 16/14; H04W 72/042; H04W 4/90; H04W 72/082; H04W 76/50; H04W 88/02; H04W 16/32; H04J 11/00; G01S 5/12; G01S 5/0236; G01S 5/0036
USPC .............. 370/328, 329, 330, 331; 455/404.2, 455/456.1
See application file for complete search history.

(56) References Cited

U.S. PATENT DOCUMENTS

| | | |
|---|---|---|
| 9,736,648 B2 | 8/2017 | Lim |
| 10,383,080 B2 | 8/2019 | Han et al. |
| 2004/0102198 A1 | 5/2004 | Diener et al. |
| 2005/0272472 A1 | 12/2005 | Goldberg et al. |
| 2010/0260154 A1 | 10/2010 | Frank |
| 2010/0273506 A1 | 10/2010 | Stern-Berkowitz |
| 2010/0331013 A1* | 12/2010 | Zhang ................... G01S 5/0242 455/456.2 |
| 2011/0081933 A1 | 4/2011 | Suh |
| 2011/0176440 A1 | 7/2011 | Frank et al. |
| 2012/0015667 A1 | 1/2012 | Woo et al. |
| 2012/0027110 A1 | 2/2012 | Han et al. |
| 2012/0190393 A1 | 7/2012 | Ishii et al. |
| 2012/0208566 A1 | 8/2012 | Siomina et al. |
| 2013/0030856 A1 | 1/2013 | Johnson |
| 2013/0194931 A1 | 8/2013 | Lee et al. |
| 2013/0237247 A1 | 9/2013 | Lee et al. |
| 2013/0258964 A1 | 10/2013 | Nam et al. |
| 2013/0272151 A1 | 10/2013 | Thomas et al. |
| 2013/0285856 A1 | 10/2013 | Opshaug et al. |
| 2013/0308567 A1 | 11/2013 | Chen et al. |
| 2014/0036849 A1 | 2/2014 | Ribeiro et al. |
| 2014/0073356 A1* | 3/2014 | Siomina ................. H04W 4/029 455/456.2 |
| 2014/0176366 A1* | 6/2014 | Fischer ............... H04W 64/006 342/374 |
| 2014/0295881 A1* | 10/2014 | Werner ................. H04W 4/023 455/456.1 |
| 2014/0348090 A1 | 11/2014 | Nguyen et al. |
| 2014/0376397 A1 | 12/2014 | Han et al. |
| 2015/0011238 A1 | 1/2015 | Tujkovic |
| 2015/0018010 A1 | 1/2015 | Fischer |
| 2015/0270936 A1 | 9/2015 | Han et al. |
| 2015/0296359 A1 | 10/2015 | Edge |
| 2015/0365790 A1* | 12/2015 | Edge ........................ G01S 19/11 455/404.2 |
| 2016/0065342 A1* | 3/2016 | Mirbagheri ........... H04W 72/02 370/330 |
| 2017/0108579 A1* | 4/2017 | Irvine ....................... H01Q 3/36 |
| 2017/0134128 A1* | 5/2017 | Opshaug ............... H04L 5/0048 |
| 2017/0374638 A1 | 12/2017 | Han et al. |

FOREIGN PATENT DOCUMENTS

| | | |
|---|---|---|
| CN | 103609179 A | 2/2014 |
| CN | 104243080 | 12/2014 |
| CN | 107113569 | 8/2017 |
| WO | 2011139201 | 11/2011 |
| WO | 2014146530 | 9/2014 |
| WO | 2014189913 | 11/2014 |
| WO | 2016122761 | 8/2016 |

OTHER PUBLICATIONS

"International Application Serial No. PCT US2015 062281, Written Opinion mailed Feb. 29, 2016", 9 pgs.
"International Application Serial No. PCT US2015 062281, International Preliminary Report on Patentability mailed Aug. 10, 2017", 7 pgs.
"Korean Application Serial No. 2017-7017362, Voluntary Amendment filed on Aug. 25, 2017", (W English Claims), 39 pgs.
"U.S. Appl. No. 15/524,842, Restriction Requirement mailed Apr. 9, 2018", 6 pgs.
"U.S. Appl. No. 15/524,842, Response filed Jun. 11, 2018 to Restriction Requirement mailed Apr. 9, 2018", 10 pgs.
"U.S. Appl. No. 15/524,842, Non Final Office Action mailed Aug. 10, 2018", 15 pgs.
"European Application Serial No. 15880632.3, Extended European Search Report mailed Aug. 23, 2018", 11 pgs.
"U.S. Appl. No. 15/524,842, Response filed Nov. 9, 2018 to Non Final Office Action mailed Aug. 10, 2018", 10 pgs.
"U.S. Appl. No. 15/524,842, Final Office Action mailed Dec. 31, 2018", 14 pgs.
"U.S. Appl. No. 15/524,842, Response filed Feb. 26, 2019 to Final Office Action mailed Dec. 31, 2018", 12 pgs.
"U.S. Appl. No. 15/524,842, Advisory Action mailed Mar. 13, 2019", 4 pgs.
"U.S. Appl. No. 15/524,842, Response filed Mar. 20, 2019 to Final Office Action mailed Dec. 31, 2018", 9 pgs.
"European Application Serial No. 15880632.3, Response Filed Mar. 19, 2019 to Extended European Search Report mailed Aug. 23, 2018", 40 pgs.
"U.S. Appl. No. 15/524,842, Notice of Allowance mailed Mar. 28, 2019", 8 pgs.
Office Action for CN Patent Application No. 202110322091.0; May 11, 2024.
Pantech and Curitel "PRS design for LTE Rel-9 positioning"; 3GPP TSG RAN WG1 Meeting #57-bis R1-092590; Jun. 29, 2009.
Ericsson et al. "Way forward on OTDOA positioning"; R1-091648; Mar. 28, 2019.
Guan et al. "Research of Urban Traffic Information Collection Technology Based on Mobile Phone Data"; Proceedings of the Seventh China Intelligent Transportation Annual Conference; Sep. 26, 2012.
Christie et al. "Development and deployment of GPS wireless devices for E911 and location based services"; 2002 IEEE Position Location and Navigation Symposium (IEEE Cat. No.02CH37284); Apr. 18, 2020.
Notice of Grant for CN 2021103220910; Jan. 2, 2025.
Motorola "Study on hearability of reference signals in LTE positioning support", 3GPP TSG RAN1 #56bis R1-091336, Mar. 23, 2009.

* cited by examiner

```
410 ─── PRS-INFO ::= SEQUENCE {
412 ─── PRS-BANDWIDTH                         ENUMERATED { N6, N15, N25, N50, N75, N100, ... },
414 ─── PRS-CONFIGURATIONINDEX INTEGER (0..4095),
416 ─── ENHANCED-PRS-CONFIGURATIONINDEXLIST   ENHANCED-PRS-CONFIGURATIONINDEXLIST           OPTIONAL   -- NEED OP
418 ─── NUMDL-FRAMES                          ENUMERATED {SF-1, SF-2, SF-4, SF-6, ...},
        ...,
        PRS-MUTINGINFO-R9
        P02-R9 P04-R9
        P08-R9 P016-
        R9                                    CHOICE {
                                                  BIT STRING  (SIZE(2)),
                                                  BIT STRING  (SIZE(4)),
                                                  BIT STRING  (SIZE(8)),
                                                  BIT STRING  (SIZE(16))},
        ...
        }

424 ─── ENHANCED-PRS-CONFIGURATIONINDEXLIST :: SEQUENCE (SIZE(1..X)) OF PRS-CONFIGURATIONINDEX
```

FIG. 4

DEVICE AND METHOD TO IMPROVE HORIZONTAL AND VERTICAL POSITIONING ACCURACY

PRIORITY CLAIM

This application is a continuation of U.S. patent application Ser. No. 16/407,148, filed May 8, 2019, which is a continuation of U.S. patent application Ser. No. 15/524,842, filed May 5, 2017, which is a U.S. National Stage Filing under 35 U.S.C. 371 from International Application No. PCT/US2015/062281, filed Nov. 24, 2015 and published in English as WO 2016/122761 on Aug. 4, 2016, which claims the benefit of priority to U.S. Provisional Patent Application Ser. No. 62/107,665, filed Jan. 26, 2015, and entitled "RAN1/RAN2: METHOD TO IMPROVE THE POSITIONING ACCURACY IN HORIZONTAL AND VERTICAL DOMAIN." Each of the foregoing applications is incorporated by reference in its entirety, as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks. Some embodiments relate to determining position in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of personal communication devices has increased astronomically over the last two decades. The penetration of mobile devices (user equipment or UEs) in modern society has continued to drive demand for a wide variety of networked devices in a number of disparate environments. The use of networked UEs using 3GPP systems has increased in all areas of home and work life. An increasing number of mobile services involve accurate determination of the UE position. One of the most common methods of location is through the use of a Global Positioning System (GPS) or Global Navigation Satellite System (GNSS). In addition to providing a location for commercial and personal applications, GPS/GNSS-enabled UEs may be used by emergency services to obtain information as to the position of the UE as part of the processing of an emergency call (E911 services). While position determination for E911 services is mandated by the Federal Communications Commission (FCC), in a number of cases, position determination based on satellite (GPS/GNSS) signals is ineffective. In particular, GPS or GNSS may not be available in certain areas due to blockage of the satellite signals, such inside buildings or other areas where the UE may be unable to detect signals from a sufficient number of satellites. This problem may only increase as the FCC guidelines become more stringent, with 67% of outdoor E911 communications presently mandated to be located with 50 m accuracy and 80% of the calls with 150 m accuracy (rising to 90% by 2020). Moreover, the FCC is proposing to extend E911 location determination to indoor locations and further require vertical location information within 3 meters of the caller for 67% of indoor E911 communications (rising to 80% by 2020).

The most recent release (Release 13) of the 3GPP standard for Long-Term-Evolution (LTE) networks contains updated requirements for position determination that are difficult to obtain due to the current positioning capabilities of networks. It would thus be desirable to improve positioning accuracy and enable vertical domain positioning of UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 4 illustrates ASN.1 code configuring multiple PRS configurations in accordance with some embodiments.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
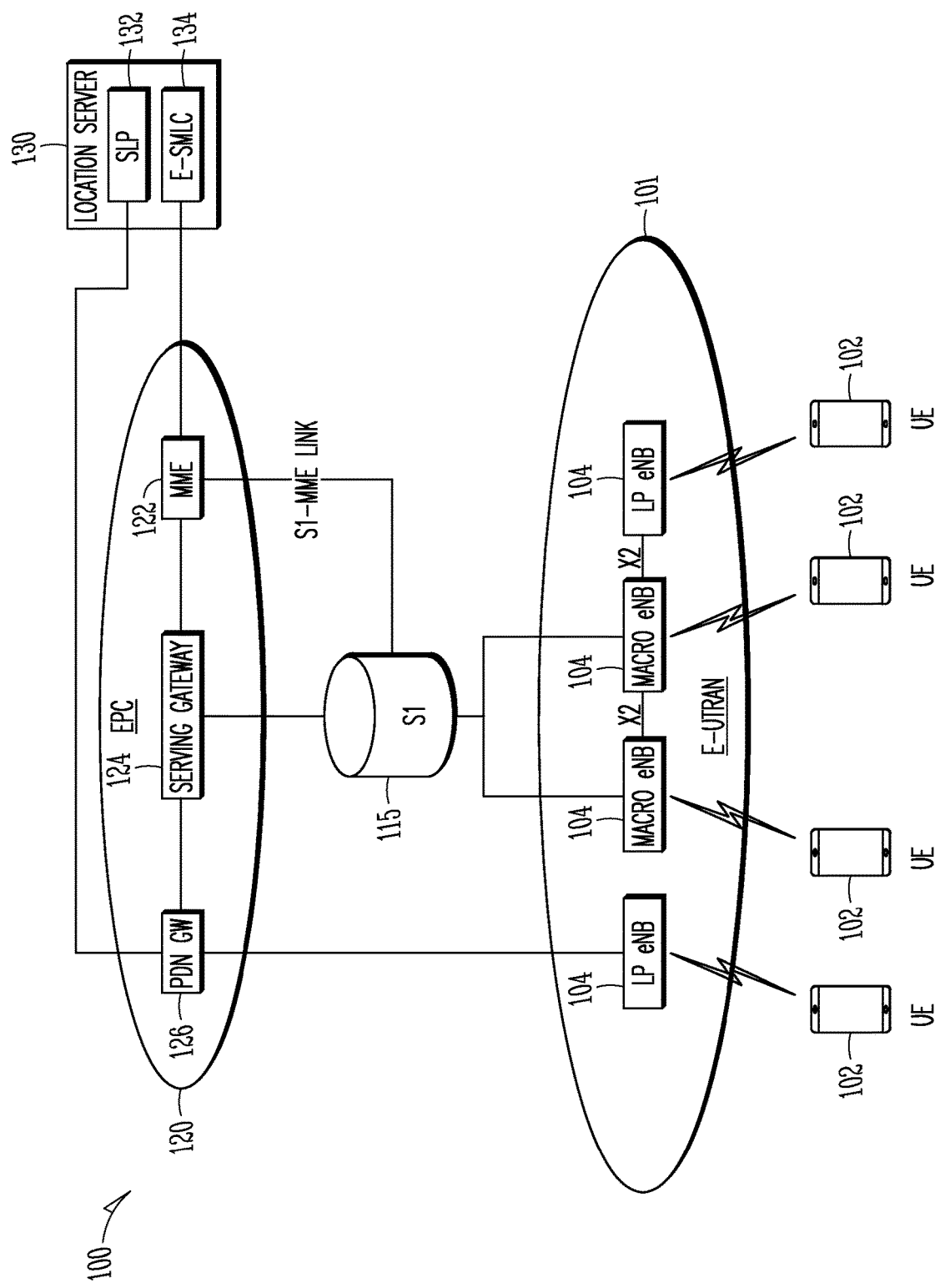
FIG. 1 is a functional diagram of a 3GPP network in accordance with some embodiments.

FIG. 1 shows an example of a portion of an end-to-end network architecture of a Long Term Evolution (LTE) network with various components of the network in accordance with some embodiments. As used herein, LTE and LTE-A networks and devices, including 3G, 4G and 5G networks and devices, are referred to merely as LTE networks and devices. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN includes enhanced node Bs (eNBs) 104 (which may operate as base stations) for communicating with user equipment (UE) 102. The eNBs 104 may include macro eNBs and low power (LP) eNBs. The eNBs 104 and UEs 102 may perform position determination using Positioning Reference Signals (PRS) as described herein.

The MME 122 may be similar in function to the control plane of legacy Serving GPRS Support Nodes (SGSN). The MME may manage mobility aspects in access such as gateway selection and tracking area list management. The serving GW 124 may terminate the interface toward the RAN 101, and route data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may be a key node for policy enforcement and charging data collection. The PDN GW 126 may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The PDN GW 126 and MME 122 may also be connected to a location server 130. The UE and eNB may communicate with the location server 130 respectively via the user plane (U-Plane) and/or control plane (C-Plane). The location server 130 may be a physical or logical entity that collects measurement data and other location information from the UE 102 and eNB 104 and assists the UE 102 with an estimation of the position of the UE 102, providing a calculation of the network-based location, as indicated in more detail below. In particular, the UE 102 may be connected to the eNB 104. The eNB 104 may be connected via the control plane to the MME 122, which in turn may be connected to an Evolved Serving Mobile Location Center (E-SMLC) 134 of the location server 130. The eNB 104 may be also connected via the user plane to the Secured User Plane (SUPL) Location Platform (SLP) 132 of the location server 130 through the PDN GW 126. The SLP 132 of the location server 130 may provide information to the UE 102 through the PDN GW 126.

The eNBs 104 (macro and micro) may terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency-Division Multiplexing (OFDM) communication signals with an eNB 104 over a multicarrier communication channel in accordance with an OFDMA communication technique. The OFDM signals may comprise a plurality of orthogonal subcarriers. Each of the eNBs 104 may be able to transmit a reconfiguration message to each UE 102 that is connected to that eNB 104. The reconfiguration message may contain reconfiguration information including one or more parameters that indicate specifics about reconfiguration of the UE 102 upon a mobility scenario (e.g., handover) to reduce the latency involved in the handover. The parameters may include physical layer and layer 2 reconfiguration indicators, and a security key update indicator. The parameters may be used to instruct the UE 102 to avoid or skip one or more of the processes indicated to decrease messaging between the UE 102 and the network. The network may be able to automatically route packet data between the UE 102 and the new eNB 104 and may be able to provide the desired information between the eNBs 104 involved in the mobility. The application, however, is not limited to this, however, and additional embodiments are described in more detail below.

The S1 interface 115 is the interface that separates the RAN 101 and the EPC 120. The S1 interface 115 may be split into two parts: the S-U, which carries traffic data between the eNBs 104 and the serving GW 124, and the S1-MME, which is a signaling interface between the eNBs 104 and the MME 122. The X2 interface is the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be used to extend coverage to indoor areas where outdoor signals do not reach well, or to add network capacity in areas with very dense phone usage, such as train stations. As used herein, the term low power (LP) eNB may refer to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to the user's broadband line. Once plugged in, the femtocell may connect to the mobile operator's mobile network and provide extra coverage in a range of typically 30 to 50 meters for residential femtocells. Thus, an LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Other wireless communication devices may be present in the same geographical region as the RAN 101. As shown in FIG. 1, WLAN devices including one or more access points (APs) 103 and one or more stations (STAs) 105 in communication with the AP 103. The WLAN devices may communicate using one or more IEEE 802.11 protocols, such as IEEE 802.11a/b/n/ac protocols. As the power of the WLAN devices 103, 105 may be fairly limited, compared with the eNBs 104, the WLAN devices 103, 105 may be geographically localized.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE 102. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 and may be frequency (full-duplex) or time (half-duplex) separated. In a Time Division Duplex (TDD) structure, the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE 102 and occupy the remainder of the subframe. Typically, downlink scheduling (assigning control and shared channel resource blocks to UEs 102 within a cell) may be performed at the eNB 104 based on channel quality information provided from the UEs 102 to the eNB, and then the downlink resource assignment information may be sent to each UE 102 on the PDCCH used for (assigned to) the UE 102. A TTI Transmission Time Interval (TTI) may be the smallest unit of time in which an eNB 104 is capable of scheduling a UE 102 for uplink or downlink transmission. The PDCCH may contain downlink control information (DCI) in one of a number of formats that tell the UE 102 how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and may be scrambled with a Radio Network Temporary Identifier (RNTI) that identifies the target UE 102 for which the PDSCH is intended. Use of the UE 102-specific RNTI may limit decoding of the DCI format (and hence the corresponding PDSCH) to only the intended UE 102.

Similarly, the uplink subframe may contain a Physical Uplink Control Channel (PUCCH) with a Physical Random Access Channel (PRACH) and a physical uplink shared channel (PUSCH). The PUCCH may provide a various control signals including HARQ acknowledgment/non-acknowledgement, one or more channel quality indicators (CQI), MIMO feedback (Rank Indicator, RI; Precoding Matrix Indicator, PMI) and scheduling requests for uplink transmission. The PUCCH may transmit in a frequency region at the edge of the system bandwidth and may comprise one RB per transmission at one end of the system bandwidth followed by a RB in the following slot at the opposite end of the channel spectrum, thus making use of frequency diversity. A PUCCH Control Region may comprise every two RBs. BPSK or QPSK may be used for modulation of PUCCH information. The PRACH may be used for random access functions and made up from two sequences: a cyclic prefix and a guard period. The preamble sequence may be repeated to enable the eNB to decode the preamble when link conditions are poor. The PMI is used for precoding, in which beams of layers are formed to increase reception quality of the layers taking into account characteristics of transmission channels. The eNB 104 may measure the channel and inform the UE 102 of a precoder employing an appropriate precoding scheme, allowing the UE 102 to perform precoding based on this information. The precoder may be represented in a matrix (i.e., precoding matrix), in which the number of rows is equal to the number of antennas and the number of columns is equal to the number of layers.

Figure 2:
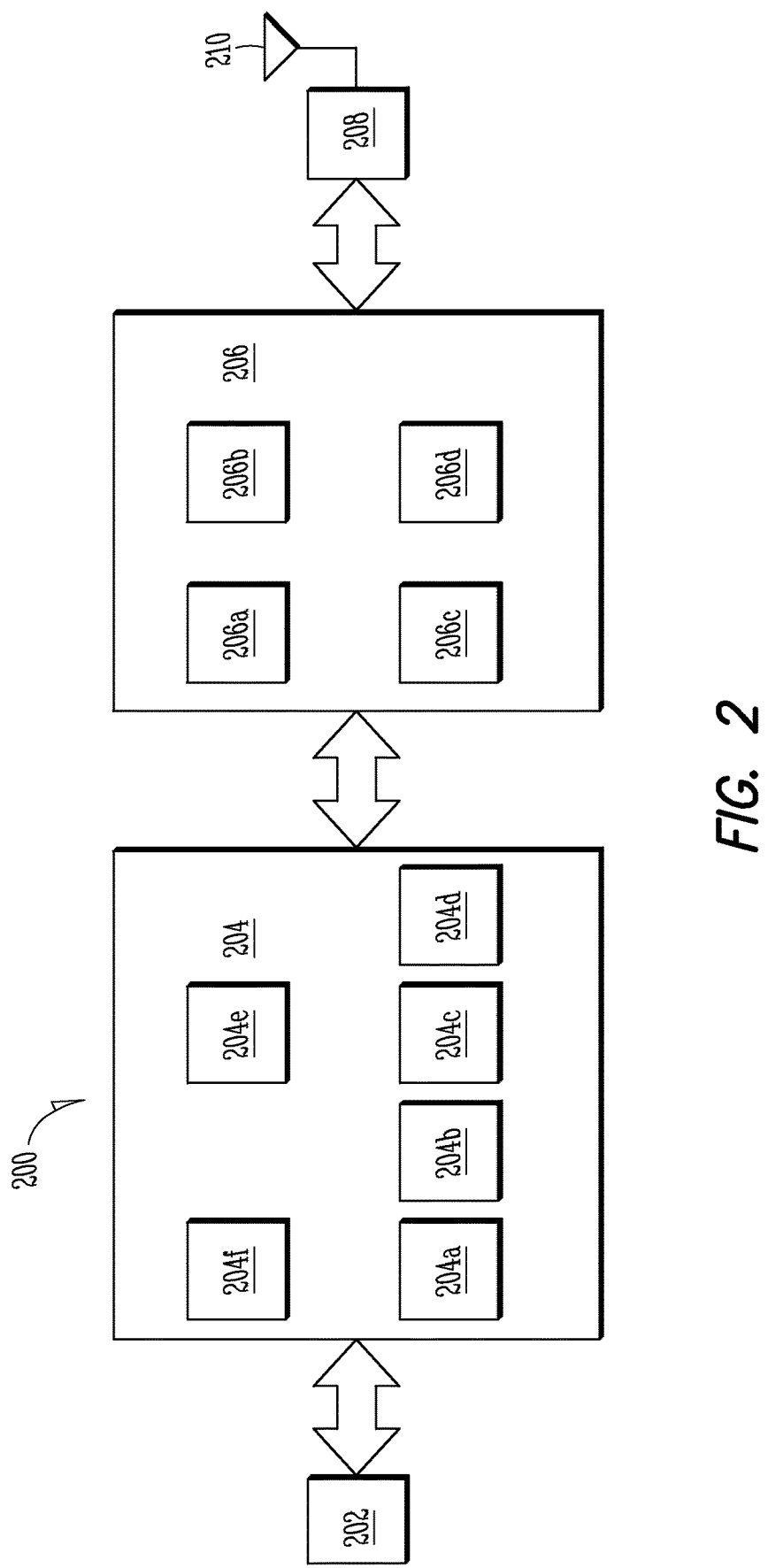
FIG. 2 illustrates components of a UE in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to determine the UE position using Positioning Reference Signals (PRS) as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204*a*, third generation (3G) baseband processor 204*b*, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

As described above, while GPS/GNSS is a common method of obtaining the location of a UE, in certain situations, such as when the satellite signals are weak (e.g. indoors), GPS/GNSS may be incapable of providing location information. In these cases, other radio access technology techniques may be used to effect location determination. These techniques may use signals that have a higher received power, relative to GNSS signals, and may be thus more capable of being used in the situations in which the GNSS signals alone are weak (and thus the UE location may only be able to be obtained after an extremely long time or is simply unable to be obtained), or in cases in which a more accurate location is desired.

In general, to obtain UE position using the radio access technology techniques, the MME 122 may receive a request for a location service associated with a particular target UE 102 from another entity, or may itself initiate the location service on behalf of a particular target UE 102. The other entity may be a UE 102, eNB 104 or E-SMLC 134. The MME 122 may initiate positional determination when for, example an E911 call is made from the UE 102. The MME 122 may send a location services request to the E-SMLC 134. The E-SMLC 134 may, in response, transmit assistance data to the UE 102 to enable UE-assisted positioning. The E-SMLC 134 may receive the corresponding measurement data from the UE 102 or eNB 104 serving the UE 102, determine a positional estimate for the UE 102 and return the positional estimate and/or an indication of assistance data transferred to the UE 102 to the MME 122. If the location service is requested, rather than being initiated by the MME 122, the MME 122 may return the location service result to the requesting entity as well as other network entities that may desire the UE location.

Different UE-assisted techniques may be used for UE position determination, including Assisted Global Navigation Satellite Systems (A-GNSS), Observed Time Difference of Arrival (OTDOA), and Enhanced Cell ID (ECID). In general, particular resource elements may be used to transmit reference signals (also called pilots) that are known to both the transmitter and receiver and used in UE-assisted techniques. These techniques may use various control signals that occupy different resource elements, such as a common reference signal (CRS) or a synchronization/pilot signal (e.g., a primary synchronization signal (PSS) or secondary synchronization signal (SSS)). A PRS, for example, may use resource elements other than the resource elements allocated to the Physical Broadcast Channel (PBC), PSS, SSS, non zero-power channel state information (CSI)-RS or the CRS sent by the eNB 104 (which may be present in all subframes). The PSS and SSS may be used by UEs for cell search and acquisition. The PSS and SSS may be transmitted by the eNB 104 in a downlink subframe in the center 1.08 MHz of the system bandwidth for each cell supported by the eNB 104. In an active cell, the PSS and SSS may be transmitted in symbol periods 6 and 5, respectively, in subframes 0 and 5 of each frame. Specifically, a PSS may be transmitted in the first subframe for an LTE type 1 frame structure and in the second subframe for an LTE type 2 frame structure. The SSS may be transmitted in the first subframe, independent of the frame structure.

In determining OTDOA, the location server 130 or eNB 104 may transmit OTDOA reference cell information to the UE 102. The OTDOA reference cell information may include a physical cell identity (physCellId), an antenna port configuration (antennaPortConfig), a cyclic prefix length (cpLength) and PRS information (prsInfo). The phyCellId may include a physical cell ID of the reference cell. The antennaPortConfig may indicate whether the reference cell uses 1 or 2 antenna ports or 4 antenna ports for a cell-specific reference signal. The cpLength may indicate a length of a cyclic prefix of PRS of a reference cell. The psrInfo may indicate information on PRS configuration of a reference cell, including a PRS configuration index (prs-ConfigurationIndex), a PRS bandwidth (prs-Bandwidth), a number of downlink frames (numDL-Frames) (referred to below as the duration) and PRS muting information (prs-MutingInfo). The PRS bandwidth may take values of 6, 15, 35, 50, 75, or 100 resource blocks. The muting parameter may indicate which PRS transmissions to mask (e.g., to permit the UE to detect weaker signals from neighboring cells).

Using the PRS for UE-assisted position determination, the PRS may be transmitted on antenna port 6 of the eNB 104 to the UE 102. The PRS may be transmitted from the eNB 104 in a predetermined number of consecutive subframes (e.g., 1-5 subframes). The number of subframes used to transmit the PRS may be configurable by the eNB 104. The PRS bandwidth (e.g., the number of RBs) and the PRS periodicity (e.g., the number of subframes between PRS occasions) may also be configured by the eNB 104. Within a subframe containing the PRS, the PRS may be transmitted on more subcarriers and more OFDM symbols as compared to regular cell-specific reference signals (CSI-RS) transmitted by the eNB 104. A pseudo-random sequence may be sent on the PRS. The pseudo-random sequence may be a function of factors such as PCI (Physical layer Cell Identity), slot number, OFDM symbol number, and the value of Cyclic Prefix. The UE 102 may detect the PRS from different neighboring eNBs 104, take measurements based on each PRS and transmits the measurements to the eNB 104. Examples of such measurements include Observed Time Difference of Arrival (OTDOA) measurements such as Reference Signal Time Difference (RSTD). RSTD is the relative timing difference between a reference eNB and a neighbor eNB. The eNB 104 may process the OTDOA measurements from the UE 102 to estimate the UE location.

The UE 102 may be provided with the PRS parameters described above, which may enable the UE 102 to process the PRS via higher layer signaling. Specifically, this information may include the carrier index or frequency band where the PRS is transmitted, bandwidth of the PRS, duration (number of consecutive subframes for PRS transmissions), transmission periodicity, subframe offset and muting sequence. The UE 102 may then report the estimated time offsets with an estimate of the measurement quality to the eNB 104 and the eNB 104 may report this information to the E-SMLC 134. The E-SMLC 134 may use the time difference estimates, the positions of the cells, which may be fixed and known, and the transmit time offsets as measured by the UE 102, to estimate the position of the UE 102. The UE 102 may, for example, report the estimated time offsets to the SLP 132.

FIGS. 3A-D show downlink channel resource blocks containing a PRS in accordance with some embodiments. FIGS. 3A-D each shows a downlink channel resource block 300 in which a PRS 314 may be transmitted in a downlink channel. The downlink channel resource block 300 may be transmitted by one of the eNBs 104. The PRS 314 may be mapped to antenna port 6. The PRS 314 may be transmitted, as shown in the downlink channel resource block 300, 340 of FIGS. 3A and 3C, on one or two PBCH antenna ports or as shown in the downlink channel resource block 320, 360 of FIGS. 3B and 3D, four PBCH antenna ports.

The subframe 302 of each of FIGS. 3A-D contains two slots 304a, 304b (slot 0/even number slots 304a and slot 1/odd number slots 304b). The downlink channel resource block 300, 320, 340, 360 of each of FIGS. 3A-D may include a plurality of resource elements 312. Each resource element 312 may correspond to an OFDM symbol 310 and a sub-carrier frequency 306.

Figure 3A:
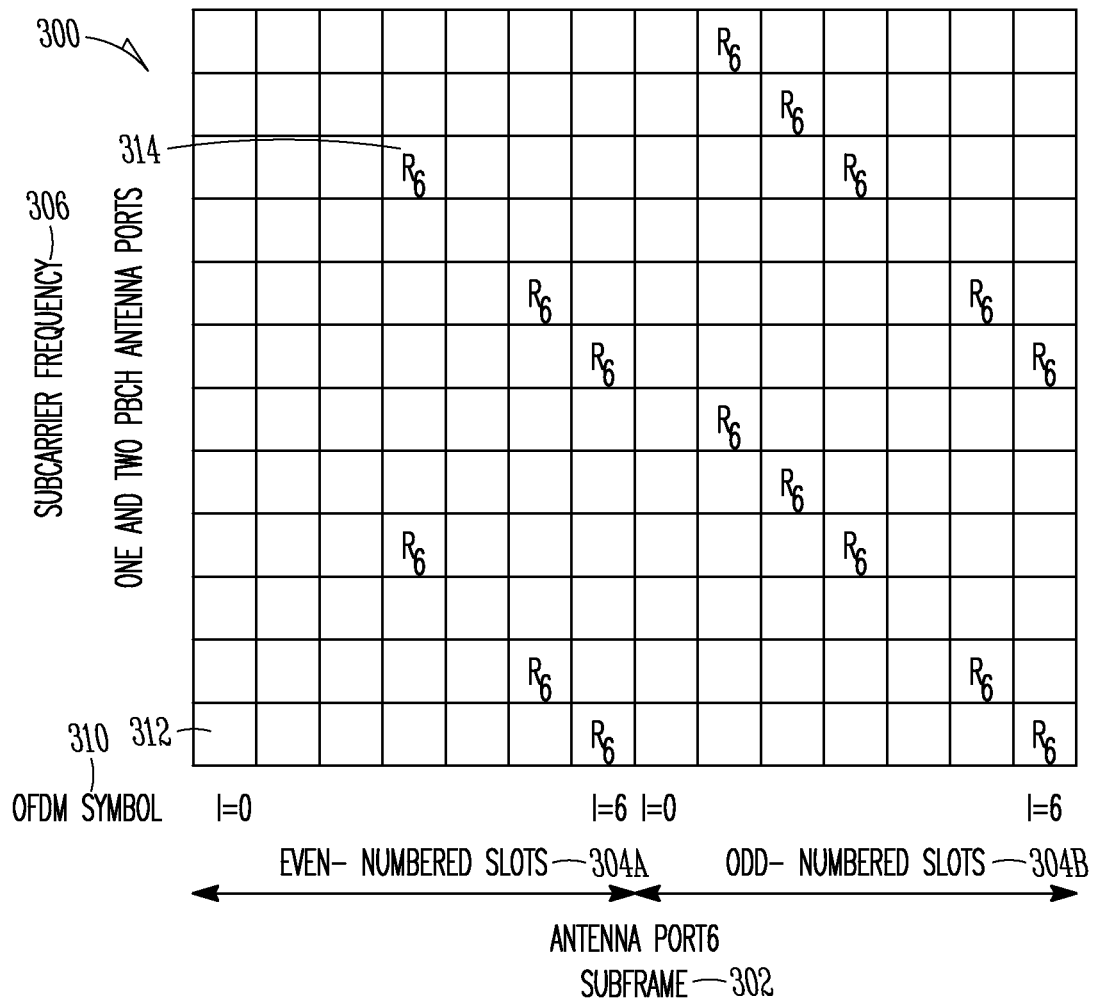
FIGS. 3A-D show downlink channel resource blocks containing a PRS in accordance with some embodiments.
Figure 3B:
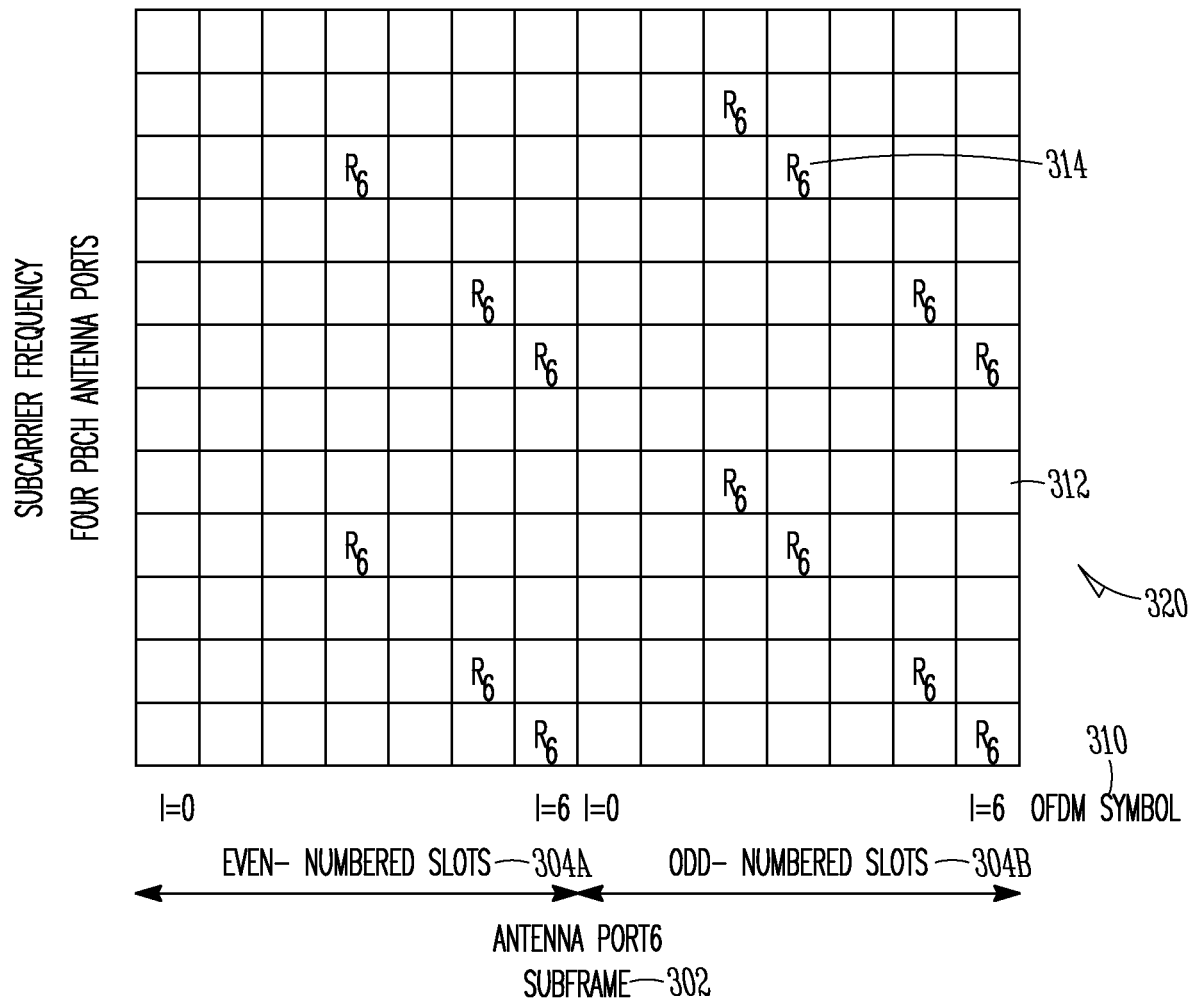
Figure 3C:
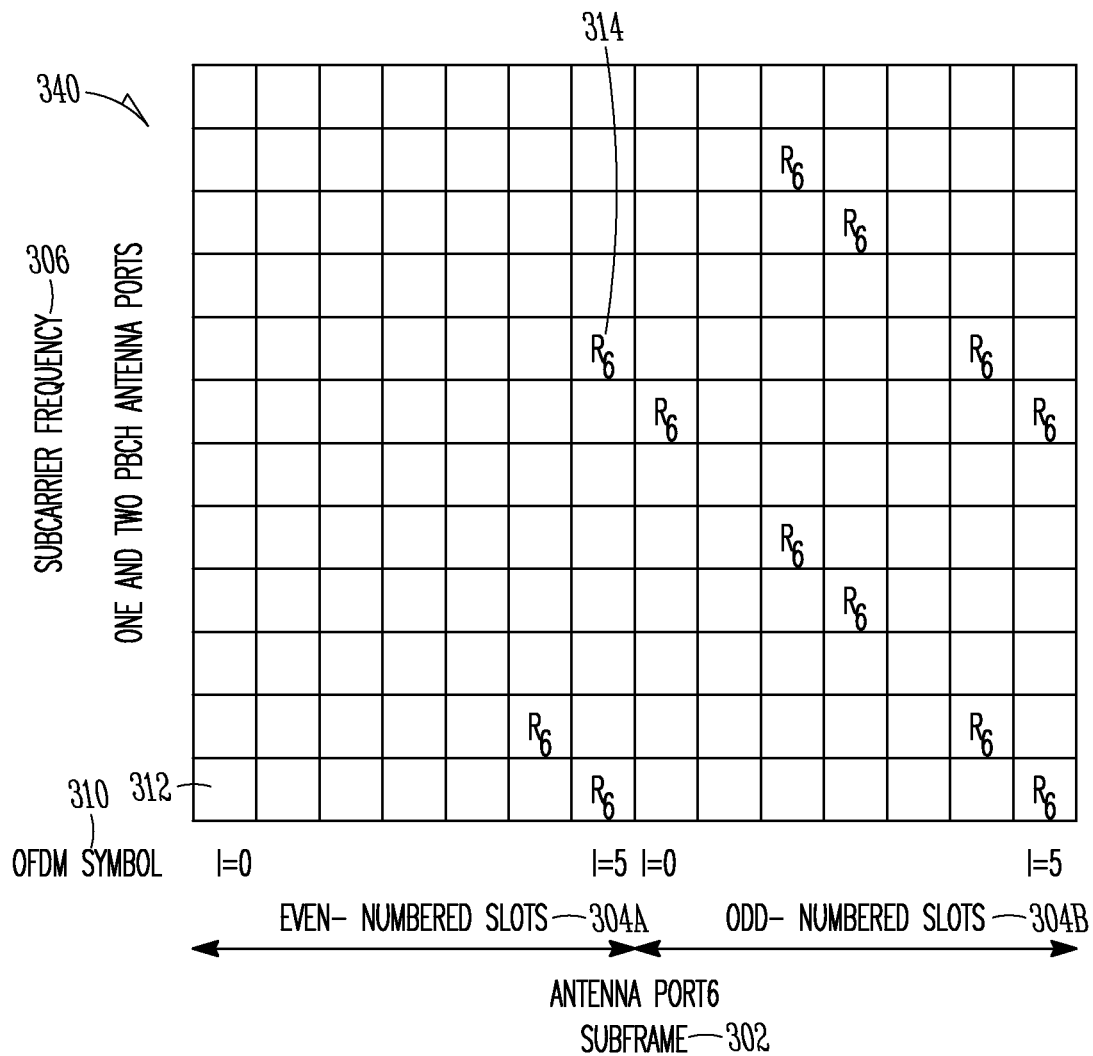
Figure 3D:
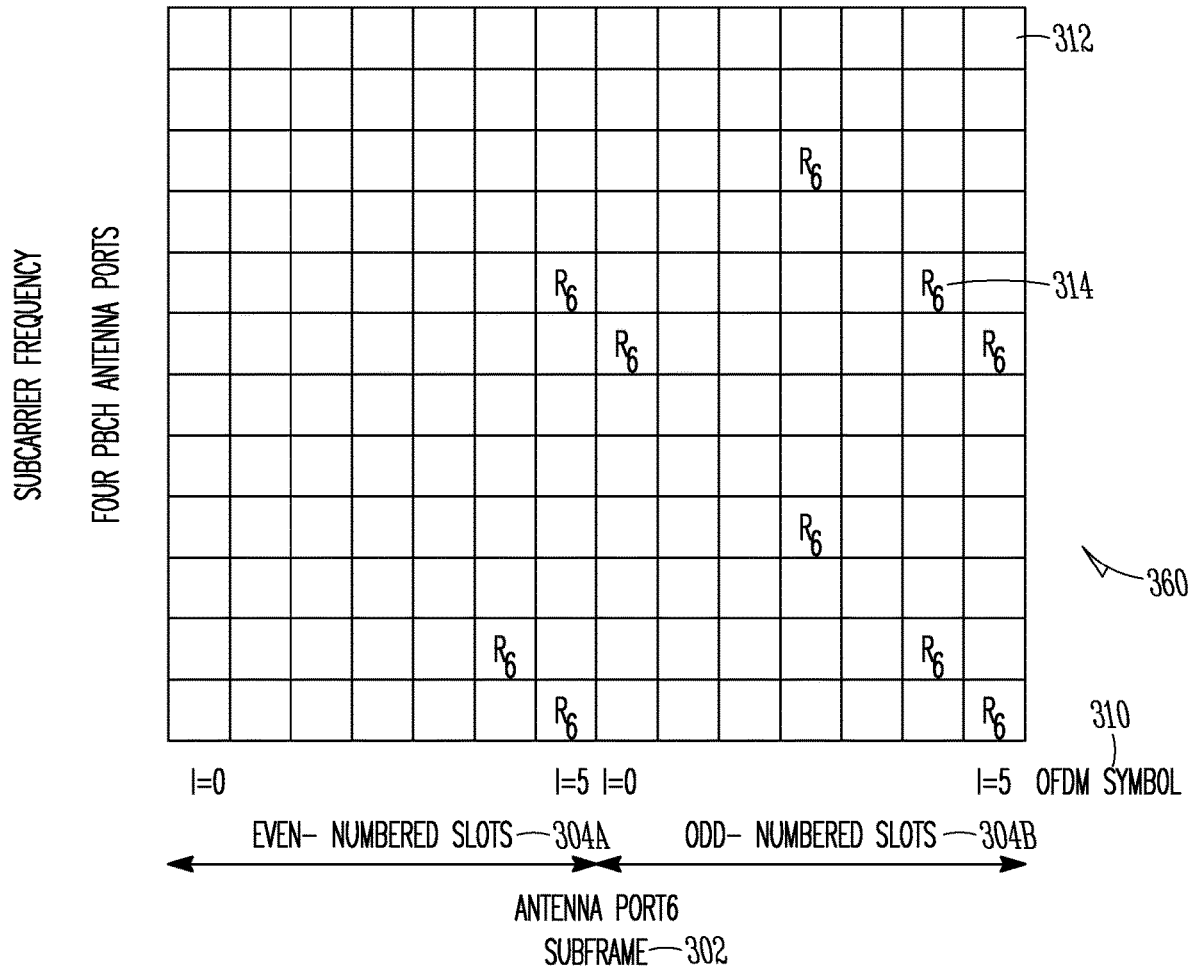

In subframes in which a normal cyclical prefix is used, as shown in FIGS. 3A and 3B, the resource elements in the downlink channel resource block 300, 320 cover fourteen OFDM symbols (l=0 to l=6) and twelve frequency sub-carriers. In subframes in which an extended cyclical prefix is used, as shown in FIGS. 3C and 3D, the resource elements in the downlink channel resource block 340, 360 cover twelve OFDM symbols (l=0 to l=5) and twelve frequency sub-carriers. The PRS 314 may be transmitted in one or more resource elements 312 of the downlink channel resource block 300, 320, 340, 360, labeled $R_6$ in FIGS. 3A-D.

As above, the parameters defining the PRS 314 may be configurable and may be provided in the prsInfo. These parameters may include a configuration index (prs-ConfigurationIndex), $I_{PRS}$, having values of 0-2399 and mapped to PRS periodicity ($T_{PRS}$) and PRS offset ($\Delta_{PRS}$) parameters. $T_{PRS}$ is the PRS periodicity (one PRS subframe every 160, 320, 640, or 1280 subframes) and APs is the subframe offset (Iprs, Iprs-160, Iprs-480 or Iprs-1120, depending on Iprs configuration index, and thus 0 to 1120). The PRS 314 parameters may also include a duration Nprs, which may be the number (e.g., 1, 2, 4 or 6) of consecutive downlink subframes with a PRS and defining a measurement period. The cell specific subframe configuration period $T_{PRS}$ and the cell specific subframe offset $\Delta_{PRS}$ for the transmission of positioning reference signals are listed in Table 1. The PRS may be transmitted only in configured NPRs consecutive downlink subframes and not transmitted in special subframes. The PRS instances, for the first subframe of the NPs downlink subframes, may satisfy:

$$(10 \times n_f + \lfloor n_s/2 \rfloor - \Delta_{PRS}) \bmod T_{PRS} = 0$$

TABLE 1

Positioning reference signal subframe configuration

| PRS configuration index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | | Reserved |

Like GPS determination, however, in some cases determination of the UE position through the use of PRS may be insufficient to provide a desired level of positional accuracy, including vertical positioning. To increase the positional accuracy, in some embodiments multiple PRS configurations and/or multiple antenna ports may be configured to permit the UE 102 to receive an increased amount of PRS energy. To enable vertical domain positioning, in some embodiments a dedicated antenna port (AP) may be defined. These features may be used by UEs implementing LTE Release 13 (or later), but may not be backward compatible with UEs implementing earlier LTE Releases as such UEs may be unable to interpret and make use of the adjusted configurations.

To increase positional accuracy, in some embodiments, a new PRS pattern may be used. The new PRS pattern may be generated by the eNB 104 copying the PRS resource elements shown in FIGS. 3A-3D from a first subframe into a second subframe and transmitting sets of replicated PRS subframes. This may provide more reference signal energy to the UE 102, thereby improving measurement performance. Whether or not the new PRS pattern is used may be determined by the eNB or location server via SIB signaling. For example, a single bit may be used to indicate whether replicated PRS subframes are to be transmitted by the eNB 104. In one embodiment, this bit may be 0 to indicate that no additional PRS subframes are to be transmitted, corresponding to the legacy PRS transmission case, and 1 to indicate that the replicated PRS subframes are to be transmitted.

In embodiments in which second (replicated) subframe(s) are consecutive with the first subframe(s), the number of PRS subframes is effectively doubled. For example, when four subframes are originally configured for the PRS (i.e., the number of consecutive subframes in the standard configuration is 4), the four consecutive subframes containing the PRS may be repeated after the final original subframe containing the PRS, thereby ultimately providing eight consecutive subframes with a PRS. In other embodiments, the eNB may take into account the subframes carrying the PSS and SSS. For example, the second subframe be the next available downlink subframe after the first subframe, e.g., for TDD frame structures or for FDD/TDD/HD-FDD frame structures to avoid PRS mapping in the subframes carrying PSS/SSS (subframe 0 and 5). In TDD frame structures, the next available downlink subframe may be separated from the last PRS subframe by one or more (uplink) subframes.

In some embodiments, the antenna port used to transmit the additional PRS pattern can be the same as the existing port used to transmit the original pattern (i.e., antenna port 6). In other embodiments, the antenna port may be different from the existing antenna port (i.e., antenna port X where X is an integer value). In some embodiments, the PRS mapping pattern on the resource elements between different subframes may be the same to reduce the complexity of implementation. In some embodiments, the PRS mapping pattern on the resource elements between different subframes may be different, which may provide additional randomization to guard against interference.

In some embodiments, the replication factor may be greater than two. The replication factor n may, in some embodiments, be an integer multiplier. This is to say that, rather than merely being duplicated (or not), the PRS subframes may be replicated n times. In one example, if n=3 and the original PRS subframes include 2 consecutive PRS subframes, 6 additional PRS subframes (which may be consecutive, e.g., if no PSS or SSS signals are to be transmitted there between) may be transmitted, such that 8 PRS subframes may be transmitted in total between consecutive original PRS subframe occasions. The bits used to indicate the presence of the replicated PRS subframes may also be used to indicate a particular pattern, such as the presence of non-consecutive PRS subframes replicating the consecutive PRS subframes. The non-consecutive PRS replicated subframes may be separated by a predetermined number of subframes as long as they are within the configured PRS period. The number of replications as well as replication pattern may be indicated by extra bits in the control information. In some embodiments, some or all of the replicated PRS subframes may precede the original PRS subframes.

Rather than, or in addition to, replicating the PRS subframes, the PRS subframes may be transmitted more frequently. This is to say that a PRS periodicity shorter than the legacy Release 13 minimum (shown in Table 1) of 160 ms may be configured. An example for the new periodicity can be 40 ms or 80 ms and may take into account the gap pattern, which provides the UE with measurement gaps in which no uplink or downlink data communications are scheduled to enable the UE to perform measurements in a different frequency band and/or on a different radio access technology. Gap Pattern ID 0, which has a length of 6 ms and a repetition rate of 40 ms, may only be available for inter-frequency RSTD measurements.

The new PRS periodicity may, as above, be an integer multiple of the Release 13 periodicity. Thus, one or more extra bits may be used to indicate the increased periodicity factor. For example, a bit may be 0 to indicate that no additional the legacy PRS periodicity is being used, and 1 to indicate that additional (replicated) PRS subframes are to be transmitted. Similarly, multiple bits may be used to indicate the factor used for the increased periodicity.

In addition, or instead of adjusting the replication and periodicity of the PRS subframes, one or more other reference signal (RS) configurations for a cell may be configured and transmitted to the UE 102 (e.g., in the prs-ConfigurationIndex) to increase the RS density. The RS may be any type of RS and may be used for location measurements, for example, PRS, CRS, or CSI-RS. Note that the above discussion is based on PRS since PRS may provide the best link budget and thus provide the best results. In some embodiments, multiple PRS-Info configurations may be transmitted to the UE 102. In some embodiments, one or more parameters in a PRS configuration (PRS-Info) may be configured.

With multiple PRS configurations being transmitted to the UE 102, the different PRS in the different configurations can be quasi co-located. Two antenna ports (and thus PRS transmissions from these ports) may be quasi co-located if the large-scale channel properties of the channel over which a symbol on one antenna port is conveyed can be inferred from the channel over which a symbol on the other antenna port is conveyed. The large-scale channel properties may include delay spread, Doppler spread, Doppler shift, average gain, average delay, received power for each port, received timing and/or frequency shift. In some embodiments, the location server may configure information indicating whether the PRS in the different configurations are quasi co-located to a UE. Such quasi co-location information may be exchanged between the eNB and the eSMLC. Quasi co-location may be ensured to utilize multiple PRS instances due to multiple PRS configurations. Alternatively, the location server may simply configure that UE to use both quasi co-located PRS instances and non quasi co-located PRS instances.

The use of quasi co-located antenna ports may permit the UE 102 to accumulate the PRS from the different configurations in coherent or non-coherent manner. Coherent accumulation may be used when the PRS is transmitted from the same antenna port and with the same precoding and the PRS experience the same fading conditions. The antenna ports of the PRS in the different PRS configurations may be identical or different. When the same antenna ports are used, the UE 102 may perform coherent accumulation to improve the RSTD measurement performance when the PRS subframes of the different configurations are close enough in time domain.

FIG. 4 illustrates ASN.1 code configuring multiple PRS configurations in accordance with some embodiments. The ASN.1 code illustrates multiple PRS configurations in a cell. As described above, the prsInfo 410 may contain parameters including the prs-Bandwidth 412, the prs-ConfigurationIndex 414, the numDL-Frames 418 and the prs-MutingInfo 422. In addition, the prsInfo 410 may include a new parameter, enhanced-prs-ConfigurationIndexList 416. Enhanced-prs-ConfigurationIndexList 416 may be defined using the ASN.1 code definition 422. Enhanced-prs-ConfigurationIndexList 416 may be defined using an indication SEQUENCE (SIZE(1 . . . X)) OF prs-ConfigurationIndex, where X may be an integer value (so X different prs-ConfigurationIndex may be used).

In some embodiments, instead of multiple PRS configurations being provided, each PRS configuration having its own independent I_PRS with an independent subframe offset and periodicity, a limited number of parameters may be provided. For example, in some embodiments only different subframe offset may be provided for signaling optimization. The different subframe offset may be, in some embodiments, related to the subframes of the existing prs-ConfigurationIndex. Thus, the replicated PRS subframes may have the same periodicity as the original PRS subframes and may merely have a different offset. For example, the original PRS subframes may have an $I_{PRS}=100$, TPRS=160 ms and $\Delta_{PRS}=100$, and the replicated PRS subframes may have an $I_{PRS}=101$, TPRS=160 ms and $\Delta_{PRS}=101$.

Figure 5:
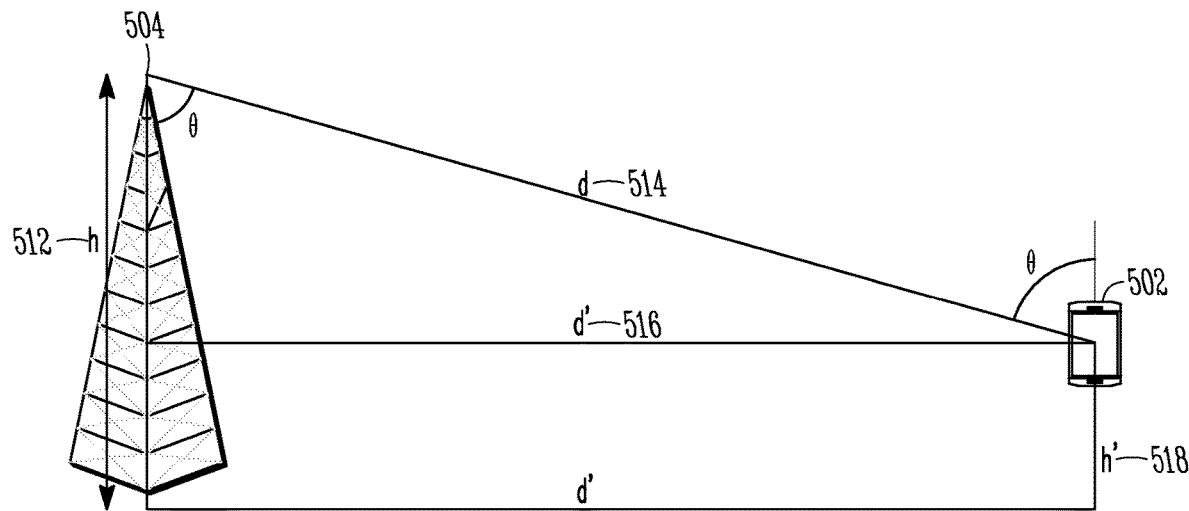
FIG. 5 shows UE location determination in both the horizontal and vertical domain in accordance with some embodiments.

Turning to vertical positioning, FIG. 5 shows UE location determination in both the horizontal and vertical domain in accordance with some embodiments. During OTDOA positioning, the eNB 504 and/or location server 130 may generally use at least two pieces of information to determine the UE location: the distance d 514 between the UE 502 and the antenna port of the eNB 504 and the height h 512 of the antenna port of the eNB 504. The distance d 514 may be derived from the measured RSTD in the LTE Positioning Protocol (LPP) or LTE Positioning Protocol A (LPPa) by the location server 130 (e.g. e-SMLC 134). The height h 512, which may be fixed and unchangeable, may be transmitted to the location server 130. The location server 130 may be able to derive the horizontal distance, d' 516, between the UE 502 and the eNB 504 based on the distance d 514 and height h 512 ($d'=\sqrt{d^2-h^2}$). The UE location may thus be able to be computed using various RSTD measurement results (practically the relative distance difference derived from the timing difference of arrival may be used for positioning, but for convenience it is herein described as the absolute distance).

In performing this calculation, the UE height may typically assumed to be on the ground, or the calculation is ignored. In some embodiments, however, rather than assuming that the UE 502 is on the ground, the location server 130 may determine the UE height using an additional piece of information determined by the UE 502, θ, the Zenith Angle of Arrival (ZoA). The ZoA may be used to represent the arrival angle in vertical domain. The ZoA, like the Angle of Arrival (AoA) used to represent the arrival angle in horizontal domain, may be measured based on uplink transmissions from the UE 502 and the known configuration of the eNB antenna array. The received UE signal between successive antenna elements may be phase-shifted, and the degree of phase shift may depend on the ZoA, the antenna element spacing, and the carrier frequency. By measuring the phase shift and using known eNodeB characteristics, the ZoA can be determined. Typical uplink signals used in this measurement are Sounding Reference Signals (SRS) or Demodulation Reference Signals (DM-RS), which may also be used to determine the uplink channel quality or timing advance.

The horizontal domain UE location may be calculated based on a OTDOA process by d' 516 from different cells, where $(d'=d \sin \theta = \sqrt{d^2-(d\cos\theta)^2})$ and d 514 is, as above, the distance between the UE 502 and the antenna port of the eNB 504. The vertical domain UE location h' 518 may be calculated based on the height h 512 and the ZOA $\theta$ of the OTDOA signal from the eNB 504, where $h'=h-d \cos \theta$. Measurements from multiple eNBs 504 may be used for vertical domain positioning to improve the accuracy.

In some embodiments, to derive $\theta$, the UE 502 may determine the ZoA or the precoding matrix by measuring a downlink signal and/or channel (such as a control signal in the PDCCH) from eNB 504. Alternatively, the ZoA or the precoding matrix may be determined by the eNB 504 by measuring an uplink signal such as the aperiodic SRS or DM-RS or the PDCCH order-based PRACH transmission, among others. In this case, the antenna port for the horizontal domain and for the vertical domain may be shared. When the UE 502 determines a metric related to $\theta$ (or ZoA/precoding matrix index), the related parameter may be defined for LPP so that the location server 130 is able to utilize the information. When the eNB 504 determines the metric related to $\theta$, the related parameter may be defined for LPPa so that the location server 130 is able to utilize the information.

In some embodiments, multiple RS configurations of the eNB 504 may be used for vertical domain positioning of the UE 502. For example, either or both PRS configurations (e.g., as described above) and/or CSI-RS processes may be used. A first RS configuration may be used for horizontal domain positioning and a second RS configuration used for vertical domain positioning. The RS configurations may be the same or may be different, and may be dependent, for example, on signal strength or other factors. The combination of the first RS and the second RS may be, e.g., {PRS, PRS}, {PRS, CSI-RS}, {CSI-RS, PRS}, {PRS, CRS}, {CRS, CRS}, {CRS, CSI-RS}.

Figure 6:
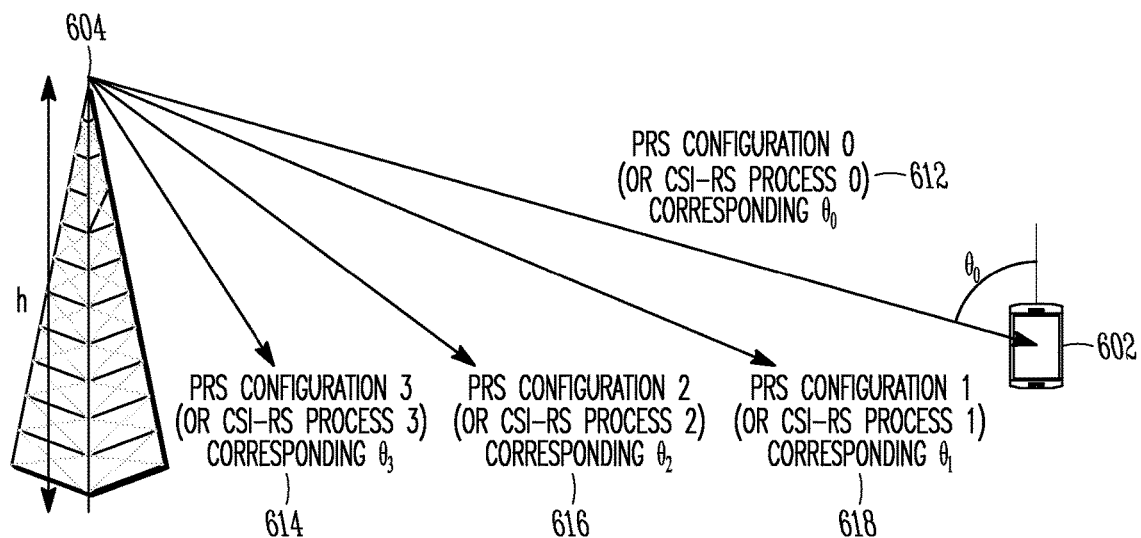
FIG. 6 shows vertical UE location determination using multiple reference signal configurations in accordance with some embodiments.

Whichever of the available RS are used, the RS transmission from the first antenna port of the eNB 504 may be used to compute horizontal domain positioning. The transmission may use, for example, a standard RS configuration or an RS configuration that has been modified, as described above in relation to FIGS. 3 and 4. FIG. 6 shows vertical UE location determination using multiple reference signal configurations in accordance with some embodiments. The RS transmission (e.g., CSI-RS or PRS) to the UE 602 from the second antenna port of the eNB 604 may be beamformed and associated with a predetermined structure. For example, four fixed vertical beams 612, 614, 616, 618 may be transmitted via four different RS configurations (e.g., CSI processes, PRS configurations, CSI-RS configurations, etc. . . . ) so that the UE 102 may be able to determine the preferred beam. The use of different RS configurations, each corresponding to a different angle, permits the UE 602 to distinguish between the different transmissions and provide the angular information to the eNB 604. The UE may measure the signals of one or more of the different configurations and determine which configuration(s) is being measured. The parameter being measured may be, for example, signal-to-interference-plus-noise-ratio (SINR), Reference Signal Receive Power (RSRP) (the average power of RE that carry the RS over the entire bandwidth), or Reference Signal Received Quality (RSRQ) (indicating the quality of the received RS). A particular configuration (or angle related parameter) having the highest value of the measured parameter may be reported by LPP signaling to the location server 130 for determination of the vertical position of the UE 602.

The different antenna ports or configurations for horizontal and vertical positioning may be quasi co-located. In this case, the second RS configuration may be used, not only for a determination of the angle but also for an RSTD measurement. In this case, the reporting order for the measurement results for the different PRS configurations may be the same as the order for the PRS configurations that are provided by the location server 130 so that the location server 130 may be able to distinguish the different information when received by the eNB 604.

Figure 7:
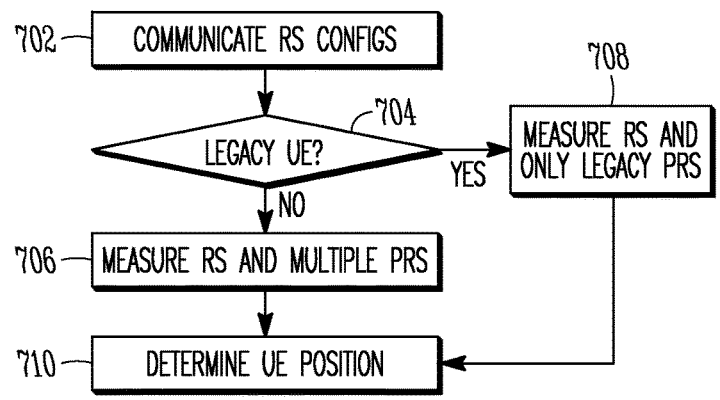
FIG. 7 illustrates a flowchart of determining UE location in accordance with some embodiments.

FIG. 7 illustrates a flowchart of determining UE location in accordance with some embodiments. The method represented by the flowcharts may be performed by the elements shown in FIGS. 1-2 and 5-6, including the UEs, eNBs and/or location server shown. At operation 702 the eNB may transmit multiple RS configurations to the UE. The RS configurations may be, for example, PRS configurations that indicate to the UE different PRS patterns are transmitted by the eNB. The PRS patterns formed by the PRS configurations may be quasi-co-located. The PRS of the different PRS configurations may be transmitted using the same or different antenna ports of the eNB. The resource elements in the non-legacy PRS subframe may merely copy the PRS resource elements from the legacy PRS subframe or may be independent of the resource elements of the legacy PRS subframe. The non-legacy PRS subframes may be consecutive or non-consecutive with the legacy PRS subframes such that the non-legacy PRS subframes occur after the legacy PRS subframes. The eNB may take into account the subframes carrying the PSS and SSS as well as using the next available downlink subframe (which may be separated from the last legacy PRS subframe due to uplink subframes). Each PRS configuration may have its own independent configuration index with an independent subframe offset and periodicity.

In some embodiments, rather than providing a new PRS configuration, the PRS configuration may be adjusted in one or more non-legacy manners. Different parameters in the PRS configuration may be altered to take non-legacy values. For example, the periodicity may be extended so that the PRS is transmitted more frequently. The repetition may take into account the gap pattern.

In addition, the UE may receive one or more other RS configurations from the eNB and/or other eNBs. The RS configurations may be for PRS, CRS, CSI-RS, SRS or DM-RS control signals to be measured by the UE for vertical positioning, as well as for determining channel quality. The same or a dedicated antenna port may be defined for the eNB for vertical positioning signal transmission as for the lateral positioning signal transmission. Different vertical beams using different RSs (or RSs with different characteristics) may be transmitted by the eNB at different angles.

As above, the UE may be a legacy UE, configured to operate using the LTE pre-Release 13 standard, or a non-legacy UE. Whether or not the new PRS pattern is used may be determined at operation 704 by the UE. The PRS configuration containing the new PRS pattern (whether a new PRS configuration is added or the legacy PRS configuration is changed) may be transmitted by the eNB via the SIB.

If the UE is not a legacy UE, the UE may read and understand the PRS configuration. The non-legacy UE may thus be able to accept either a new PRS configuration in addition to the legacy PRS configuration, or may be able to accept non-legacy values used in the PRS configuration. The non-legacy UE may at operation 706, measure the entire set of PRS (both legacy and non-legacy). The non-legacy UE may also obtain and measure the RS signals from the eNB(s). The non-legacy UE may determine a ZOA or precoding matrix using the RS signals.

If the UE is a legacy UE, the UE may in some embodiments be unable to read and understand a separate and new non-legacy PRS configuration or a PRS configuration having non-legacy values. The legacy UE may in the former case ignore the separate non-legacy PRS configuration. In the latter case, the legacy UE may either be unable to understand the values provided in the modified legacy PRS configuration, and send an error message to the eNB, or may use a default set of values as provided by the eNB through control signaling. The legacy UE may at operation 708, measure only the legacy PRS. The legacy UE may also obtain and measure the RS signals from the eNB(s). The legacy UE may determine a ZOA or precoding matrix using the RS signals.

Whether or not the UE measures both the legacy and non-legacy PRS or only the legacy PRS, at operation 710, the UE may report the estimated time offsets and an estimate of the measurement quality to the eNB. The eNB may, in turn, report the information from the UE to the location server. The location server may use the time difference estimates, the known positions of the cells, and the measured transmit time offsets to estimate the lateral position of the UE from the eNB.

The location server may also receive the RS measurements from the UE. The location server may alternatively or in addition receive at least one of ZOA and precoding matrix information. The UE may distinguish between the different transmissions and provide the angular information to the eNB. In particular, in whichever of operation 706 or 708 is appropriate, the UE may measure the signals of one or more of the different configurations having the best characteristics and determine which configuration(s) is being measured prior to reporting to the eNB/location server. Using this information, as well as the distance of the UE from the eNB, the location server may also calculate the vertical position of the UE.

Figure 8:
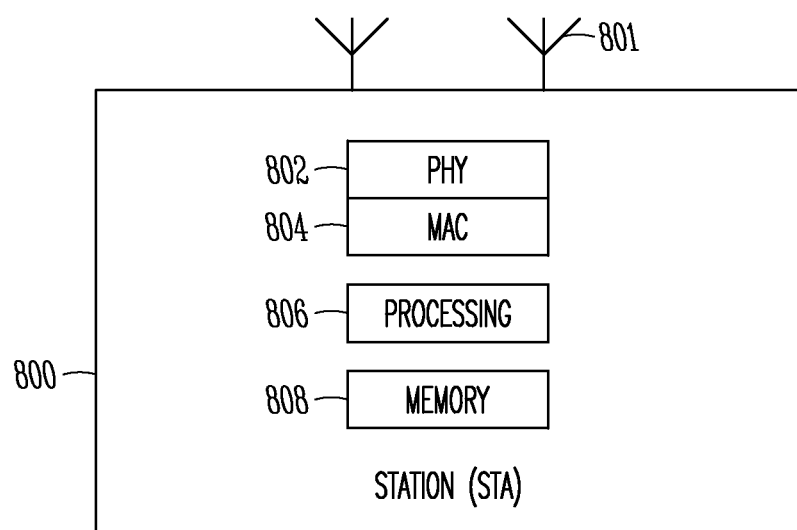
FIG. 8 is a block diagram of a communication device in accordance with some embodiments.

FIG. 8 is a block diagram of a communication device in accordance with some embodiments. The device may be a UE or eNB, for example, such as the UE 102 or eNB 104 shown in FIG. 1 that may be configured to track the UE as described herein. The communication device 800 may include physical layer circuitry 802 for transmitting and receiving signals using one or more antennas 801. The communication device 800 may also include medium access control layer (MAC) circuitry 804 for controlling access to the wireless medium. The communication device 800 may also include processing circuitry 806, such as one or more single-core or multi-core processors, and memory 808 arranged to perform the operations described herein. The physical layer circuitry 802, MAC circuitry 804 and processing circuitry 806 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 800 can be configured to operate in accordance with 8GPP standards or other protocols or standards, including WiMax, WiFi, GSM, EDGE, GERAN, UMTS, UTRAN, or other 8G, 8G, 4G, 5G, etc. technologies either already developed or to be developed.

The antennas 801 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 801 may be effectively separated to take advantage of spatial diversity and the different channel characteristics that may result.

Although the communication device 800 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 9:
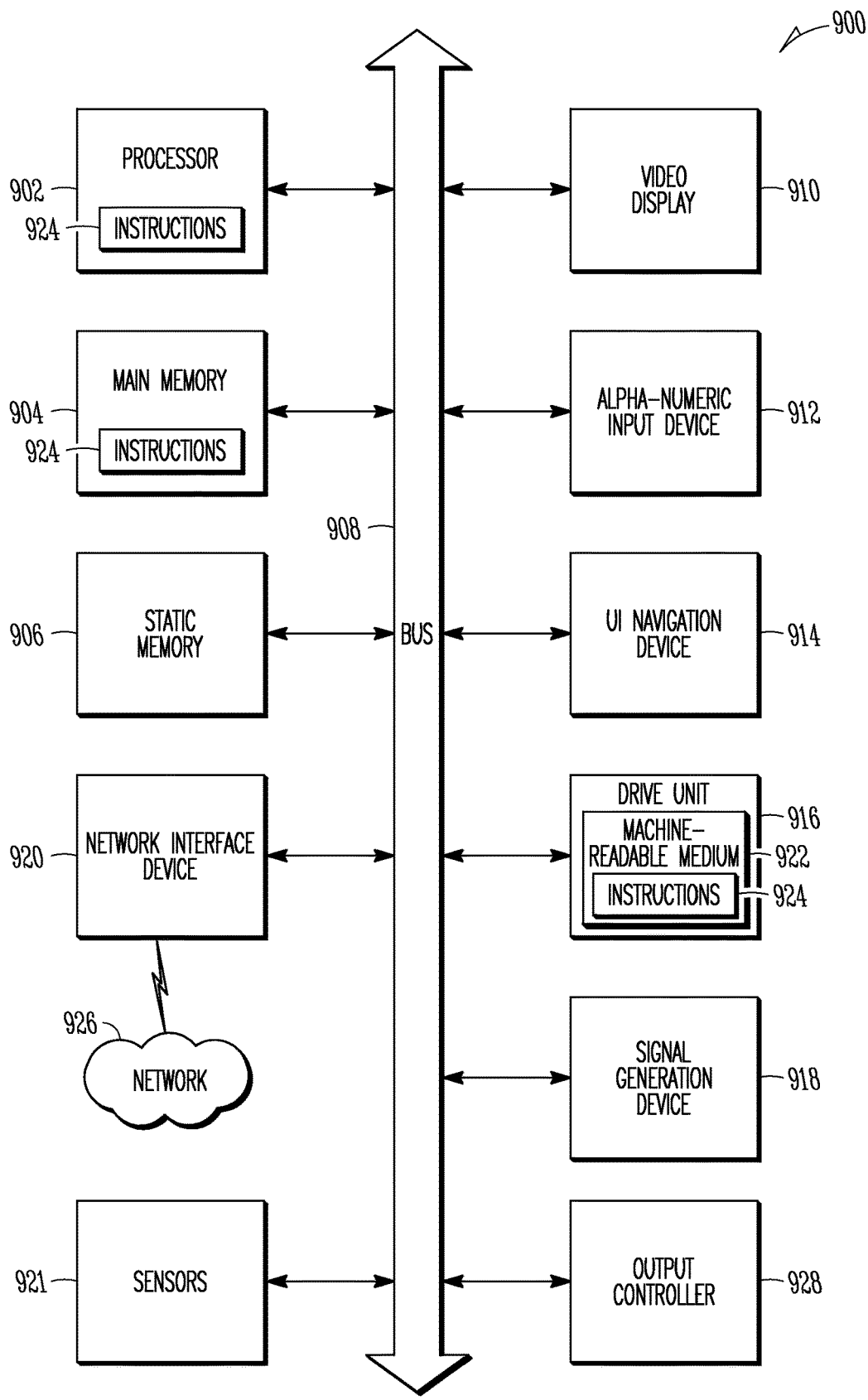
FIG. 9 illustrates a block diagram of an example machine in accordance with some embodiments.

FIG. 9 illustrates a block diagram of an example machine in accordance with some embodiments. The any one or more of the techniques (e.g., methodologies) discussed herein may be performed by example machine 900. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a UE, eNB, AP, STA, personal computer (PC), a tablet PC, a STB, a PDA, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Example 1 is an apparatus of user equipment (UE) comprising: a transceiver arranged to communicate with an enhanced NodeB (eNB); and processing circuitry arranged to: configure the transceiver to receive a plurality of Reference Signals (RSs), the RSs comprising a first Positioning Reference Signal (PRS) pattern received in a first set of PRS subframes and a second PRS pattern received in a second set of PRS subframes received by the transceiver prior to a subsequent first set of PRS subframes; measure PRS resource elements (REs), each comprising a PRS, in the first and second PRS pattern; and configure the transceiver to transmit a measurement of the PRS in each of the first and second PRS pattern to enable horizontal and vertical positioning of the UE to be determined based on the measurements.

In Example 2, the subject matter of Example 1 optionally includes that the processing circuitry is further arranged to configure the transceiver to receive a prsInfo control signal comprising a first and second PRS configuration, the first and second PRS configurations respectively indicating the first and second PRS patterns.

In Example 3, the subject matter of Example 2 optionally includes that the first and second PRS configurations comprise a legacy PRS configuration and a non-legacy PRS configuration, the legacy PRS configuration indicating PRSs receivable by legacy and non-legacy UEs and a non-legacy PRS configuration receivable by non-legacy UEs, legacy UEs configured to communicate using standards prior to Release 13 of the Third Generation Partnership Project Long Term Evolution (3GPP LTE) standard.

In Example 4, the subject matter of any one or more of Examples 2-3 optionally include that each of the first and second PRS configuration comprises parameters independent of parameters in the other of the first and second PRS configuration, the parameters including a configuration index with a subframe offset and periodicity.

In Example 5, the subject matter of any one or more of Examples 1-4 optionally include that PRS REs in a non-legacy PRS subframe of a non-legacy PRS pattern replicate a PRS RE in a legacy PRS subframe of a legacy PRS pattern.

In Example 6, the subject matter of any one or more of Examples 1-5 optionally include that the first and second PRS patterns are quasi co-located.

In Example 7, the subject matter of any one or more of Examples 1-6 optionally include that the first and second set of PRS subframes are consecutive downlink subframes, excluding one or more subframes succeeding the first PRS set of subframes and preceding the second set of PRS subframes that each comprises at least one of a primary synchronization signal (PSS) and a secondary synchronization signal (SSS).

In Example 8, the subject matter of any one or more of Examples 1-7 optionally include, wherein the processing circuitry is further arranged to configure the transceiver to receive a prsInfo control signal comprising a PRS configuration, the PRS configuration indicating PRS subframes having a periodicity of less than 160 ms forming the first and second PRS patterns.

In Example 9, the subject matter of any one or more of Examples 1-8 optionally include that the PRS of the first and second PRS patterns are received from different antenna ports of the eNB.

In Example 10, the subject matter of any one or more of Examples 1-9 optionally include that the RSs further comprise a vertical positioning RS received from a different antenna port than a lateral positioning RS.

In Example 11, the subject matter of Example 10 optionally includes that the processing circuitry is further arranged to measure a Reference Signal Time Difference (RSTD) using at least one of the RSs, and determine at least one of a Zenith Of Arrival (ZOA) and precoding matrix of the at least one of the RSs, the RSTD and the at least one of the ZOA and precoding matrix provides information to determine a vertical position of the UE.

In Example 12, the subject matter of Example 11 optionally includes that the lateral and vertical positioning RSs comprise different RS configurations, at least one of the different antenna ports and configurations are quasi co-located, and the processing circuitry is further arranged to configure the transceiver to transmit measurement results for the lateral and vertical positioning RSs in a same order as the RS configurations are received by the transceiver.

In Example 13, the subject matter of any one or more of Examples 1-12 optionally include that the processing circuitry is further arranged to configure the transceiver to receive the RSs at different angles, the RSs received at different angles comprising different RS configurations; measure the RSs; determine a particular RS configuration having a highest value of a measured parameter among the RS configurations of the RSs; and configure the transceiver to report the particular RS configuration to a location server.

In Example 14, the subject matter of any one or more of Examples 1-13 optionally further comprise an antenna configured to transmit and receive communications between the transceiver and at least one of the source and target eNB.

Example 15 is an apparatus of an enhanced NodeB (eNB) comprising: a transceiver arranged to communicate with user equipment (UE); and processing circuitry arranged to configure the transceiver to transmit to the UE a prsInfo control signal comprising at least one PRS configuration; configure the transceiver to transmit to the UE a plurality of Reference Signals (RSs) subsequent to transmitting the prsInfo control signal, the RSs comprising a first Positioning Reference Signal (PRS) pattern in a first set of PRS subframes and a second PRS pattern in a second set of PRS subframes transmitted by the transceiver prior to a subsequent first set of PRS subframes; configure the transceiver to receive from the UE a measurement of the PRS in each of the first and second PRS pattern; and determine horizontal and vertical positioning of the UE based on the measurements.

In Example 16, the subject matter of Example 15 optionally includes that the prsInfo control signal comprises a first and second PRS configuration, the first and second PRS configurations respectively indicate the first and second PRS patterns, and at least one of: the first and second PRS configurations comprise a legacy PRS configuration and a non-legacy PRS configuration, the legacy PRS configuration indicating PRSs receivable by legacy and non-legacy UEs and a non-legacy PRS configuration receivable by non-legacy UEs, legacy UEs configured to communicate using standards prior to Release 13 of the Third Generation Partnership Project Long Term Evolution (3GPP LTE) standard, and each of the first and second PRS configuration comprises parameters independent of parameters in the other of the first and second PRS configuration, the parameters including a configuration index with a subframe offset and periodicity.

In Example 17, the subject matter of any one or more of Examples 15-16 optionally include that PRS resource elements (REs) in a non-legacy PRS subframe of a non-legacy PRS pattern replicate PRS RE in a legacy PRS subframe of a legacy PRS pattern.

In Example 18, the subject matter of any one or more of Examples 15-17 optionally include, wherein the processing circuitry is further arranged to determine whether an intermediary subframe, which comprises at least one of a primary synchronization signal (PSS) and a secondary synchronization signal (SSS), is to be transmitted between the first PRS set of subframes and the second set of PRS subframes; configure the transceiver to transmit the first and second set of PRS subframes in non-consecutive downlink subframes in response to determining that the intermediary subframe is to be transmitted; and configure the transceiver to transmit the first and second set of PRS subframes in consecutive downlink subframes in response to determining that no intermediary subframe is to be transmitted.

In Example 19, the subject matter of any one or more of Examples 15-18 optionally include that the PRS of the first and second PRS patterns are received from different antenna ports of the eNB.

In Example 20, the subject matter of any one or more of Examples 15-19 optionally include that the RSs further comprise a vertical positioning RS received from a different antenna port than a lateral positioning RS.

In Example 21, the subject matter of any one or more of Examples 15-20 optionally include that the processing circuitry is further arranged to configure the transceiver to receive from the UE a measured metric related to at least one of a Zenith Of Arrival (ZOA) and precoding matrix of the at least one of the RSs; and configure the transceiver to transmit to an Evolved Serving Mobile Location Center (E-SMLC) via Long Term Evolution (LTE) Positioning Protocol Annex (LPPa) information related to the measured metric for determination of a vertical position of the UE.

In Example 22, the subject matter of Example 21 optionally includes that the RSs further comprise a vertical positioning RS and a lateral positioning RS comprising different RS configurations, and the processing circuitry is further arranged to configure the transceiver to receive from the UE measurement results for the lateral and vertical positioning RSs in a same order as the RS configurations are transmitted by the transceiver.

In Example 23, the subject matter of any one or more of Examples 15-22 optionally include that the processing circuitry is further arranged to configure the transceiver to transmit the RSs at different angles, the RSs transmitted at different angles comprising different RS configurations.

Example 24 is a non-transitory computer-readable storage medium that stores instructions for execution by one or more processors of a user equipment (UE) to configure the UE to communicate with an enhanced NodeB (eNB), the one or more processors to configure the UE to receive a prsInfo control signal comprising at least one PRS configuration and subsequently a plurality of Reference Signals (RSs), the RSs comprising a first Positioning Reference Signal (PRS) pattern received in a first set of PRS subframes and a second PRS pattern received in a second set of PRS subframes received by the transceiver prior to a subsequent first set of PRS subframes, the RSs comprising a vertical positioning RS and a lateral positioning RS; measure PRS resource elements (REs), each comprising a PRS, in the first and second PRS pattern; and transmit a measurement of the PRS in each of the first and second PRS pattern to enable horizontal and vertical positioning of the UE to be determined based on the measurements.

In Example 25, the subject matter of Example 24 optionally includes that the prsInfo control signal comprises a first and second PRS configuration, the first and second PRS configurations respectively indicating the first and second PRS patterns, the first and second PRS configurations comprise a legacy PRS configuration and a non-legacy PRS configuration, the legacy PRS configuration indicating PRSs receivable by legacy and non-legacy UEs and a non-legacy PRS configuration receivable by non-legacy UEs, legacy UEs configured to communicate using standards prior to Release 13 of the Third Generation Partnership Project Long Term Evolution (3GPP LTE) standard, and each of the first and second PRS configuration comprises parameters independent of parameters in the other of the first and second PRS configuration, the parameters including a configuration index with a subframe offset and periodicity.

In Example 26, the subject matter of any one or more of Examples 24-25 optionally include that the lateral and vertical positioning RSs comprise different RS configurations, the one or more processors further configure the UE to measure a Reference Signal Time Difference (RSTD) using at least one of the RSs, and determine at least one of a Zenith Of Arrival (ZOA) and precoding matrix of the at least one of the RSs, the RSTD and the at least one of the ZOA and precoding matrix provides information to determine a vertical position of the UE.

In Example 27, the subject matter of any one or more of Examples 24-26 optionally include that the one or more processors further configure the UE to receive the RSs at different angles, the RSs received at different angles comprising different RS configurations; measure the RSs; determine a particular RS configuration having a highest value of a measured parameter among the RS configurations of the RSs; and report the particular RS configuration to a location server.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A user equipment (UE) comprising:
a transceiver; and
processing circuitry coupled to the transceiver, wherein the processing circuitry is configured to:
decode a positioning protocol message, from a location server, comprising positioning reference signal (PRS) information for a cell for use in performing measurements of time difference of arrival (TDOA), wherein the PRS information comprises a first PRS information element, wherein the first PRS information element includes a first PRS configuration and a second PRS configuration for the cell, wherein the first and second PRS configurations have respective periodicities and respective offsets.

2. The user equipment of claim 1, wherein the processing circuitry is further configured to:
decode first PRSs based on the first PRS configuration and second PRSs based on the second PRS configuration.

3. The user equipment of claim 2, wherein the first PRSs and the second PRSs are decoded in consecutive downlink subframes, wherein the consecutive downlink subframes exclude one or more subframes, wherein each of the one or more subframes comprises at least one of a primary synchronization signal (PSS) and a secondary synchronization signal (SSS).

4. The user equipment of claim 2, wherein the first PRSs and second PRSs are associated with different antenna ports of a base station.

5. The user equipment of claim 2, wherein the processing circuitry is further configured to:
encode, for transmission to a base station, measurements based on the first and second PRSs.

6. The user equipment of claim 1, wherein the first and second PRSs are quasi-co-located.

7. The user equipment of claim 1, wherein the first PRS configuration comprises a legacy PRS configuration, wherein the second PRS configuration comprises a non-legacy PRS configuration.

8. An apparatus comprising processing circuitry configured to cause a user equipment (UE) device to:
decode a positioning protocol message, from a location server, comprising positioning reference signal (PRS) information for a cell for use in performing measurements of time difference of arrival (TDOA), wherein the PRS information comprises a first PRS information element, wherein the first PRS information element includes a first PRS configuration and a second PRS configuration for the cell, wherein the first and second PRS configurations have respective periodicities and respective offsets.

9. The apparatus of claim 8, wherein the processing circuitry is further configured to cause the UE device to:
decode first PRSs based on the first PRS configuration and second PRSs based on the second PRS configuration.

10. The apparatus of claim 9, wherein the first PRSs and the second PRSs are decoded in consecutive downlink subframes, wherein the consecutive downlink subframes exclude one or more subframes, wherein each of the one or more subframes comprises at least one of a primary synchronization signal (PSS) and a secondary synchronization signal (SSS).

11. The apparatus of claim 9, wherein the first PRSs and second PRSs are associated with different antenna ports of a base station.

12. The apparatus of claim 9, wherein the processing circuitry is further configured to cause the UE device to:
encode, for transmission to a base station, measurements based on the first and second PRSs.

13. The apparatus of claim 8, wherein the first and second PRSs are quasi-co-located.

14. The apparatus of claim 8, wherein the first PRS configuration comprises a legacy PRS configuration, wherein the second PRS configuration comprises a non-legacy PRS configuration.

15. An apparatus comprising processing circuitry configured to cause a user equipment (UE) device to:
decode a positioning protocol message, from a location server, comprising positioning reference signal (PRS) information for a cell for use in performing measurements of observed time difference of arrival (OTDOA), wherein the PRS information comprises at least a first PRS information element and a second PRS information element, wherein the first PRS information element includes a first PRS configuration index for the cell, wherein the second PRS information element includes a second PRS configuration index for the cell.

16. The apparatus of claim 15, wherein the processing circuitry is further configured to cause the UE device to:
decode first PRSs based on a first PRS configuration indicated by the first PRS configuration index; and
decode second PRSs based on a second PRS configuration indicated by the second PRS configuration index.

17. The apparatus of claim 16, wherein the first PRSs and the second PRSs are decoded in consecutive downlink subframes, wherein the consecutive downlink subframes exclude one or more subframes, wherein each of the one or more subframes comprises at least one of a primary synchronization signal (PSS) and a secondary synchronization signal (SSS).

18. The apparatus of claim 16, wherein the first PRSs and second PRSs are associated with different antenna ports of a base station.

19. The apparatus of claim 16, wherein the processing circuitry is further configured to cause the UE device to:
encode, for transmission to a base station, measurements based on the first and second PRSs.

20. The apparatus of claim 16, wherein the first and second PRS configurations have respective periodicities and respective offsets.

* * * * *